United States Patent [19]

Nakamura et al.

[11] Patent Number: 5,168,662
[45] Date of Patent: Dec. 8, 1992

[54] PROCESS OF STRUCTURING STATOR OF BUILT-IN MOTOR

[75] Inventors: Kosei Nakamura, Hino; Yoshiyuki Hayashi, Minamitsuru; Kazuhisa Numai, Minamitsuru; Masami Kimijima, Minamitsuru, all of Japan

[73] Assignee: Fanuc Ltd., Yamanashi, Japan

[21] Appl. No.: 820,836

[22] Filed: Jan. 15, 1992

Related U.S. Application Data

[62] Division of Ser. No. 571,544, Aug. 23, 1990, Pat. No. 5,142,179.

[30] Foreign Application Priority Data

Dec. 28, 1988 [JP] Japan .................. 63-329115

[51] Int. Cl.⁵ .................................... B24B 1/00
[52] U.S. Cl. .................................... 51/289 R; 51/323; 310/42
[58] Field of Search ............... 51/165.75, 289 R, 323; 310/42, 43, 264, 260, 208, 216

[56] References Cited

U.S. PATENT DOCUMENTS 3,769,756  11/1973  Kipple et al. ............ 51/165.75
4,015,154  3/1977  Tanaka et al. ............ 310/42

Primary Examiner—Bruce M. Kisliuk
Assistant Examiner—Eileen Morgan
Attorney, Agent, or Firm—Nikaido, Marmelstein, Murray & Oram

[57] ABSTRACT

The stator of a built-in motor must be firmly and accurately mounted on the spindle head housing or the like of a machine tool. A stator core (10), i.e., a principal component of the stator is welded partially at the circumference (14) thereof, and then the circumference of the stator core (10) held by a mandrel is finished to an accurate outside diameter by grinding. The stator core (10) thus constructed is subjected to a deformation with a lapse of time after the mandrel has been removed. To solve this problem, each lamination (12) of the stator core (10) is coated with a thermosetting adhesive, to be thereby joined together, and each lamination (12) is provided with a plurality of pressed projections (22) to be joined together by weld portions (20) on the circumference of the stator core (10), or each lamination (12) is joined together by pressing a serrated bar (26) into a bore (24) thereof, without a pressed projection (22).

2 Claims, 3 Drawing Sheets

PROCESS OF STRUCTURING STATOR OF BUILT-IN MOTOR

This is a continuation, of application Ser. No. 571,544 filed Aug. 23, 1990 now U.S. Pat. No. 5,142,179.

TECHNICAL FIELD

The present invention relates to a stator structure of a built-in motor to be incorporated into the spindle or the like of a machine tool.

BACKGROUND ART

A built-in type spindle motor for driving the spindle of a machine tool or the like has been increasingly used recently, to meet the demand for cost reductions, floor space reductions, and miniaturization. The stator of a built-in motor for such a purpose must be accurately fixed to the spindle head housing or the like of a machine tool, and a stator core is built up by superposing high-permeability steel laminations and fixedly uniting the superposed laminations by welding the circumference thereof, and then the stator core is finished to an accurate external size by grinding.

As the laminations of the stator core are welded only in the circumference of the stator core, however, the laminations are not fastened together in the inside portion of the stator core, and thus the inside portion of the stator core has a low rigidity but the outside portion of the stator core has a high rigidity. Therefore, it is possible that the stator core is deformed with a lapse of time when the stator core having such a construction and held by a mandrel is ground and is removed from the mandrel after grinding. It is also possible for the stator core to be deformed during transportation or when subjected to a winding process or a varnish-impregnating process.

DISCLOSURE OF THE INVENTION

Accordingly, an object of the present invention is to provide a stator structure having the least possibility of deformation after manufacture.

In view of the foregoing object, in a first aspect of the present invention, a stator of a built-in motor is built up by superposing laminations coated with a thermosetting adhesive.

In a second aspect of the present invention, a stator of a built-in motor is built up by superposing laminations, each provided with through holes, and by welding the outer circumference of the laminated structure and pressing connecting bars provided with projections in the circumferences thereof into the through holes of the laminated structure.

In a third aspect of the present invention, a stator of a built-in motor is built up by superposing laminations, each provided at predetermined positions with projections formed by pressing so as to project in one direction, with the projections engaging the adjacent laminations to form a laminated structure, and welding the outer circumference of the laminated structure.

The rigidity of the inside portion of any one of those stator is enhanced, as well as the outside portion of the same, by the adhesive and the connecting bars or the projections, so that the difference in the rigidity of the outside portion and the inside portion is small, and consequently, the stator is less liable to be deformed. When the laminations are coated entirely with the adhesive, in particular, the difference in the rigidity of the outside portion and the inside portion is reduced to the smallest extent possible, and the stator has a high rigidity.

BEST MODE OF CARRYING OUT THE INVENTION

Figure 1:
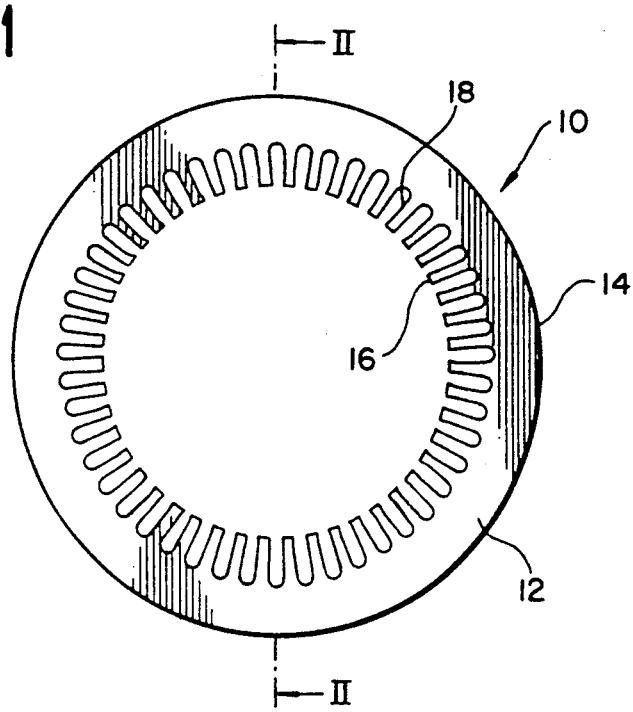
FIG. 1 is a front view of a rotor core according to the present invention.
Figure 2A:
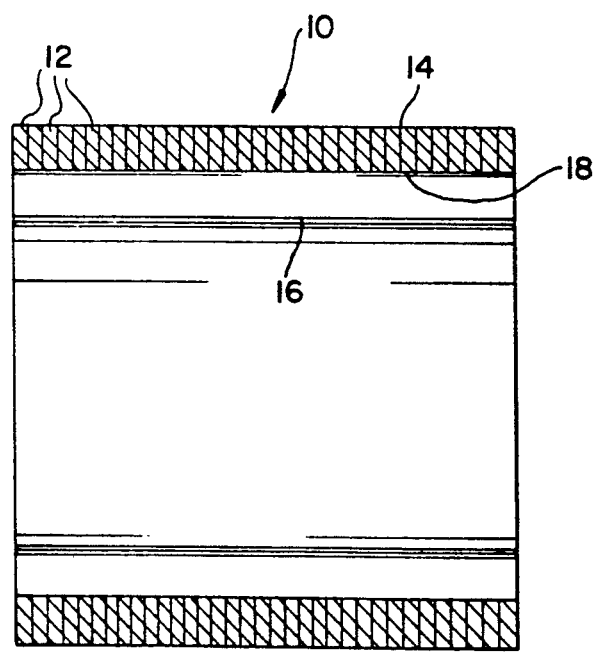
FIG. 2a is a sectional view of the rotor core taken along the line II—II in FIG. 1.
Figure 2B:
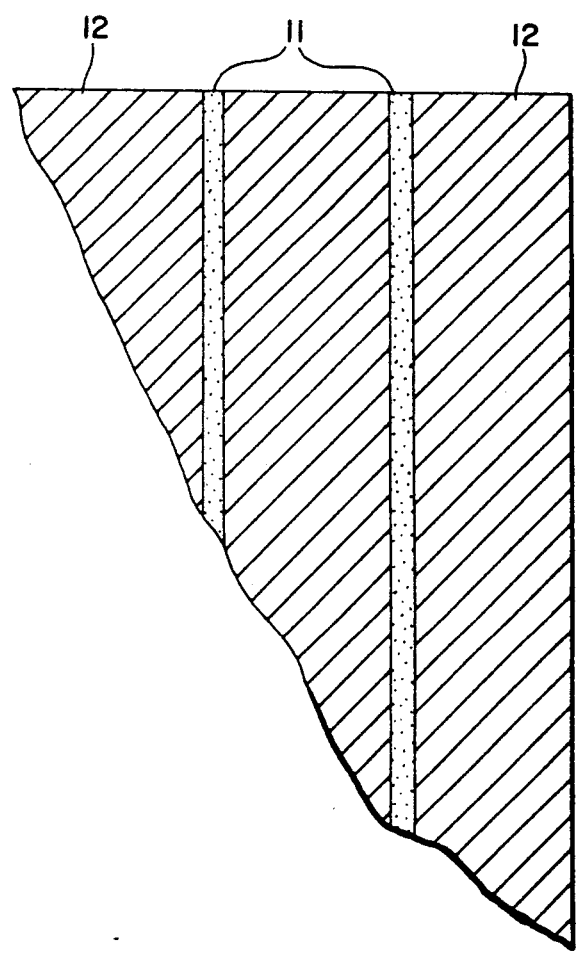
FIG. 2b is an enlarged broken portion of the sectional view of FIG. 2a showing the coated adhesive.

Preferred embodiments of the present invention will be described hereinafter with reference to the accompanying drawings. Referring to FIGS. 1 and 2, a stator core 10, i.e., the body of a stator for a motor, is built up by superposing a plurality of high-permeability steel laminations 12. The stator core 10 is fabricated by applying a thermosetting adhesive 11, such as an epoxy resin, to the entire surfaces of the high-permeability laminations 12 in a film having a thickness of several microns, superposing the high-permeability laminations 12 to form a laminated structure, compressing the laminated structure with a jig for temporary fixing, heating the laminated structure at a temperature of about 150° C. for a predetermined time, to join the high-permeability laminations 12 firmly together, and grinding the outer circumference 14 of the laminated structure held by a mandrel to improve the accuracy of the outside diameter of the laminated structure. Since the component laminations 12 of the stator core 10 are coated entirely with the adhesive 11, the stator core 10 has a uniform rigidity, and since the component laminations 12 are joined firmly together, the stator core 10 is not deformed and the given outside diameter sized by grinding is maintained after the mandrel has been removed. Accordingly, the stator core 10 can be accurately incorporated into the spindle head housing (not shown) or the like of a machine tool, for example, by a shrinkage fit, so that an accurate rotative driving of the spindle can be effected.

Figure 3:
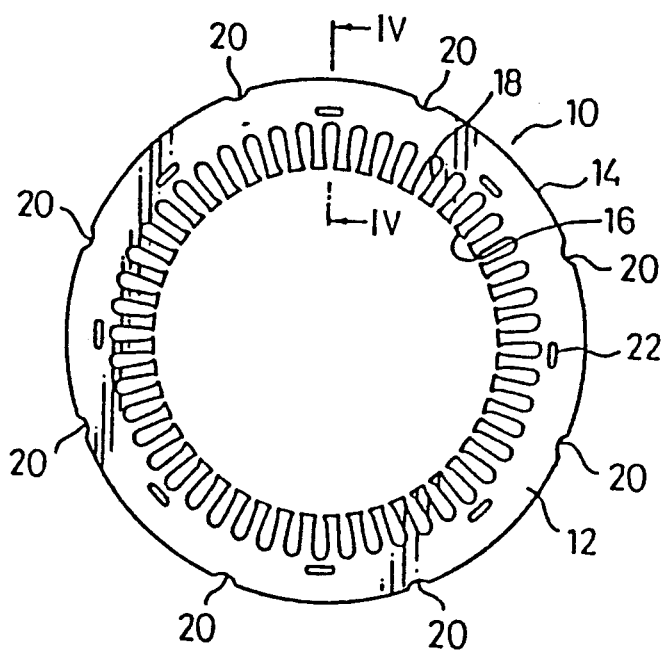
FIG. 3 is a front view of a rotor core in a second embodiment according to the present invention.
Figure 4:
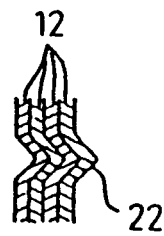
FIG. 4 is a fragmentary sectional view taken along the line IV—IV in FIG. 3.

The outer circumference of the stator core 10 in the first embodiment does not need the welding essential to the conventional stator core, but a stator core in a second embodiment according to the present invention employs welding in addition to the other fastening means. Referring to FIGS. 3 and 4, each component lamination 12 of a stator core 10 is provided with pressed projections 22 at a plurality of positions (at eight positions in this embodiment). The pressed projections 22 are formed when punching out the laminations 12 from a sheet. For example, the height of the pressed projections 22 is about 1 mm when the thickness of the laminations 12 is on the order of 0.5 mm. The eight pressed projections 22 are formed in each lamination 12 between the outer circumference 14 and the inner circumference 16, at positions as near as possible to the inner circumference 16. Since the laminations 12 are provided in the inner circumferences thereof with recesses 18 for forming slots, the pressed projections 22 are formed near the recesses 18. The pressed projections 22 are arranged at equal angular intervals. The weld portions 20 of the outer circumference of the stator core are positioned at intermediate angular positions between the adjacent pressed projections 22.

This construction increases the rigidity of the inside portion of the stator core to reduce the difference in the rigidity of the outside portion and the inside portion of the stator core, and enhances the general rigidity of the stator core; that is, the pressed projections engage each other as shown in FIG. 4 to enhance the general rigidity of the stator core.

Figure 5:
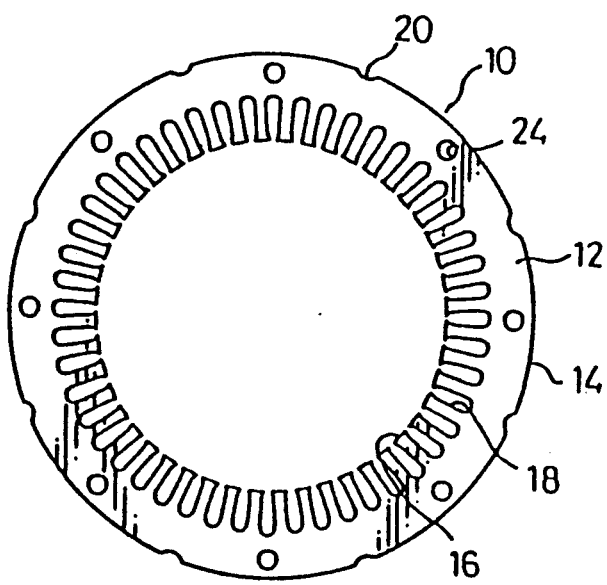
FIG. 5 is a front view of a rotor core in a third embodiment according to the present invention.
Figure 6:
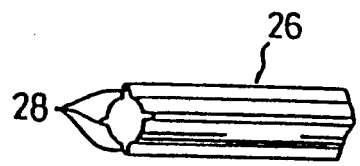
FIG. 6 is a fragmentary perspective view of a serrated bar.

A third embodiment according to the present invention will be described hereinafter with reference to FIGS. 5 and 6. The outer circumference 14 of the stator in the third embodiment, similar to the stator shown in FIG. 3, has eight weld portions 20 distributed at equal angular intervals fusing the laminations at their periphery. Bores 24 are formed in the stator core at middle angular positions between the angular positions of the adjacent weld portions 20. As shown in FIG. 6, serrated bars 26 externally provided with ridges 28 are pressed in the bores 24 to join together the component laminations 12 of the stator core. Since the serrated bars 26 have longitudinally extending ridges, the bore 24 are formed on a circle of a diameter greater than that of a circle on which the pressed projections 22 shown in FIG. 3 are arranged, but it is preferable to form the bores 24 as near as possible to the inner circumference 16.

The stator core in the third embodiment, when compared with the conventional stator core formed by fastening together the component laminations by welding only the circumference 14, has a small difference in the rigidity of the outside portion and inside portion and has a high general rigidity, because the component laminations are joined firmly together in the inside portion of the stator core with the serrated bars 26.

As apparent from the foregoing description, the present invention reduces the difference in the rigidity of the outside portion and the inside portion of a stator core and enhances the general rigidity of the stator core, and thus the possibility of deformation with a lapse of time is significantly reduced when a mandrel is removed after grinding the circumference of the stator core held on the mandrel. Thus, the present invention provides a stator finished to a high accuracy and having a high reliability for a built-in motor.

We claim:

1. A process of structuring a stator core of a built-in motor from a plurality of sheet-like high-permeability steel laminations, comprising the steps, performed in the recited order exclusive of other steps, of:

preparing a plurality of sheet-like high-permeability steel laminations;

applying a thermosetting adhesive to entire surfaces of each of said plurality of sheet-like high-permeability steel laminations to thereby form a film-like coating of said thermosetting adhesive having a thickness of less than ten microns;

superimposing said plurality of sheet-like high-permeability steel laminations coated with said thermosetting adhesive to thereby form a laminated core structure;

heating said laminated core structure having superimposed laminations therein to substantially 150 degrees centigrade, for a predetermined time, to thereby harden said thermosetting adhesive film between adjacent said sheet-like high-permeability steel laminations to join the laminations firmly together; and after said heating step, mounting said laminated core structure on a mandrel suited for subjecting said laminated core structure to a grinding operation by a grinding machine at an outer diameter of said laminated core structure, and grinding said laminated core structure of sheet-like high-permeability steel laminations to thereby establish a predetermined outer diameter of said laminated core structure for said stator core.

2. A process as recited in claim 1 wherein said heating step further includes compressing said laminated core structure.

* * * * *